United States Patent [19]

Kaneko et al.

[11] 4,298,244
[45] Nov. 3, 1981

[54] INFORMATION RECORDING METHOD AND APPARATUS

[75] Inventors: Yutaka Kaneko, Kawasaki; Mitsuhisa Fukuda, Tokyo, both of Japan

[73] Assignee: Ricoh Company, Ltd., Japan

[21] Appl. No.: 16,101

[22] Filed: Feb. 28, 1979

[30] Foreign Application Priority Data

Feb. 28, 1978 [JP] Japan .................................. 53-22468
May 19, 1978 [JP] Japan .................................. 53-59810
Jun. 20, 1978 [JP] Japan .................................. 53-74723

[51] Int. Cl.³ .............................................. G03H 1/22
[52] U.S. Cl. .................................................. 350/3.78
[58] Field of Search ................... 350/3.71, 3.75, 3.78, 350/3.79; 178/15, 28, 29, 35; 354/15; 364/900; 340/956, 752

[56] References Cited

U.S. PATENT DOCUMENTS 3,249,028   5/1966   Higonnet et al. ................. 178/15 X Primary Examiner—John K. Corbin
Assistant Examiner—Bruce Y. Arnold
Attorney, Agent, or Firm—McGlew and Tuttle

[57] ABSTRACT

An information recording method and apparatus capable of reducing the access time of a recording medium disc at the time of each reading are disclosed. In photoelectric conversion of information patterns for use in an information recording, a scanning coordinate of a photoelectric conversion is caused to coincide with the direction of a prescribed coordinate of a received light pattern. Furthermore, a hologram information reproducing apparatus for use in a character producing apparatus is disclosed, which employs a flexible light condensing photo-transmitter whose shape is determined by a reproduction light.

1 Claim, 24 Drawing Figures

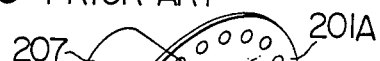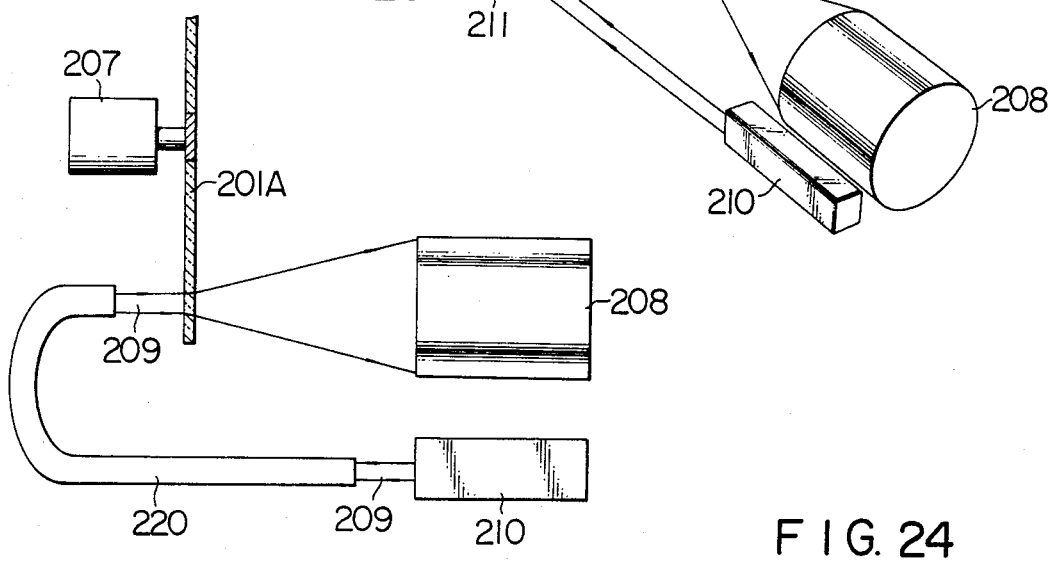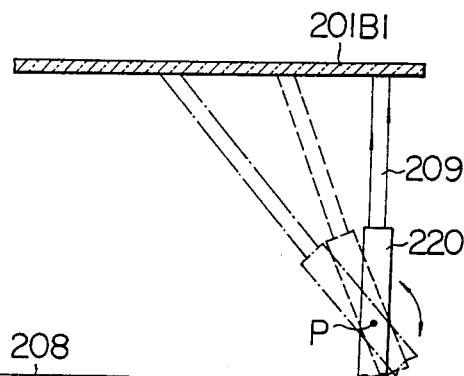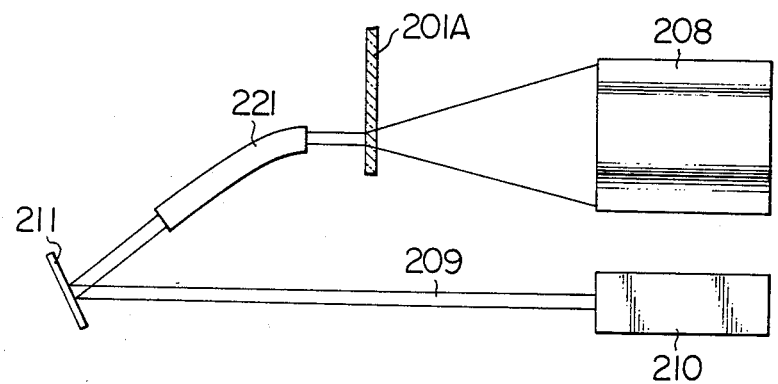

INFORMATION RECORDING METHOD AND APPARATUS

BACKGROUND OF THE INVENTION

The present invention relates to an information recording method to be applied to information recording apparatus, such as character producing apparatus, and particularly to an image information recording method employing a disc-shaped recording medium.

Referring to FIG. 1, there is shown a general outline of a reproducing mechanism of the recording method of this type. On the surface of a recording medium disc 2, which is driven to a predetermined rotating position by a motor 1, such as a pulse motor, a recording medium is attached and on the peripheral portion of the same surface, a scale with address marks 3 for determining the rotating position of the disc 2 is placed. Furthermore, on the surface of the recording medium disc 2, there are formed two rows of concentric tracks with different diameters, an outer track 4 and an inner track 5. Multiple hologram image information 6 and 7 are recorded on the respective tracks 4 and 5, with a predetermined pitch. An electro-optic pair comprising a light emitting element 8 and light receiving element 9 for optically detecting the address mark 3 is fixedly disposed in close proximity to the recording medium disc 2, with the disk 2 positioned therebetween. The light emitting element 8 and the light receiving element 9 and the motor 1 constitute a control servo-system for actuating the disc 2, whereby the disc 2 is driven and stopped at a predetermined position in accordance with an indicated operation order.

In front of the disc 2, there is disposed a laser generation apparatus 10 which faces the tracks 4 and 5. A laser L projecting from the laser beam generation apparatus 10 is directed selectively to the track 4 or to track 5 in accordance with a deflection order when it passes through a deflecting apparatus 11 comprising a light deflecting element or a galvanomirror.

The diffracted light of the image information 6 and 7 which is selectively illuminated by the above-mentioned illuminating operation, is received by a photoelectric conversion element 12 disposed fixedly in close proximity to the peripheral portion of the disc 2. As a result, the image information 6 or 7 comes out of the photoelectric conversion element in the form of an electric signal, so that the recorded information on the disc 2 is read and reproduced.

In this type of the disc 2, the image information 6 and 7 is recorded as shown in FIG. 2. For example, the image information 6, which may be ABC . . . LMN . . . , is recorded in the track 4, and as the image information 7, different information, such as abc . . . lmn . . . , is recorded in the track 5. Therefore, the above-mentioned conventional recording method has an advantage that information capacity is great. On the other hand, it has a shortcoming in that it is difficult to speed up the reading speed at the time of reproduction.

This is true because, at the time of each reading step, the address mark 3 is detected and access to a necessary rotating position of the disc 2 is then obtained. When necessary, transfer from one track to another has to be conducted with the laser diffracted, which also takes time. The time necessary for track transfer is as short as several msec, but the access operation time is as long as 10 msec or more.

This is because there is a limitation to the rotation speed of the disc 2 since the driving force of the drive motor 1 and the strength of the disc 2 are limited. Furthermore, the maximum rotation angle of the disc 2 at the time of the access operation is $\pi$ rad, for example, when reading is transferred from information A (or information a) to information L (or information l), while the minimum rotation angle of the disc 2 is zero when reading is transferred from information A to information a. Thus, the arithmetical mean of the rotation angle of the disc 2 is about $\pi/2$ rad for each access rotation.

Referring to FIG. 4, in a character producing apparatus of the hologram disc rotating type, a hologram disc 101 with multiple patterns, such as characters, recorded thereon, is rotated and a laser from a laser producing apparatus 102 is directed onto a selected pattern of the patterns and the pattern ray is projected on a vidicon 103 which serves as a photoelectric conversion tube, so that electric signals corresponding to the received light pattern are produced.

In the case of a character producing apparatus of a microfilm disc rotating type, as shown in FIG. 5, a microfilm disc 104 is rotated and light is projected onto a selected pattern by an illumination light source 105. The pattern ray is projected on the vidicon 103 through an optical system 106, so that electric signals corresponding to the received light pattern are produced.

In the case of a character producing apparatus of the running hologram film running type, as shown in FIG. 6, a hologram sheet 107 is caused to run and a laser from the laser producing apparatus 102 is directed in a selected pattern through a deflection apparatus 108 and the pattern ray is projected on the vidicon 103, so that electric signals corresponding to the received light pattern are produced.

In each of these character producing apparatuses, the capacity for storing information is great and accordingly the cost of each bit is advantageously low. It is, however, necessary to establish access to the recording medium, such as the disc 101 or 104, or the sheet 107, accurately at the necessary position in accordance with a selected call for an information pattern.

To be more specific, when the access position of the recording medium varies, the position and the angle of the pattern ray on the light receiving surface of the vidicon 103 also vary. Consequently, omission or deformation of the produced signals occurs, which has an adverse effect on the conversion operation.

More specifically, as shown in FIG. 7, when the directions of the writing coordinates x-x, y-y of the received light pattern of a kanji deviate with respect to the direction of the coordinate direction of the beam scanning of the vidicon 103, X-X, and Y-Y, signals produced by the electric conversion are dislocated as shown in FIG. 8, and when such dislocated signals are printed by a dot type printer, such as an ink jet printer, a multi-stylus printer, and a wire dot printer, similarity of the pattern is not attained and the quality of the printed character form is lowered.

In some of the conventional character producing apparatuses of this sort, for example, in the techniques as disclosed in Japanese laid-open patent applications Nos. 49-81053 and 51-43641, a reference mark for indicating the inscripted position of the pattern is attached to each pattern and by reading the mark, the access position of the recording medium is adjusted. In this case, however, the inscription coordinates of the recording medium cannot be caused to coincide with the directions of the scanning coordinates of the scanning of the vidicon.

Particularly, in the case of information comprising line images, such as Chinese characters, good printing quality cannot be obtained by adjusting the access position.

By making the driving system of the recording medium more accurate, the access accuracy can be improved to some extent, but the apparatus becomes more expensive and is impractical.

Furthermore, a large quantity of information can be recorded in high density by the hologram recording method and recording and reproduction of information is comparatively easy.

In the hologram to be used as an information recording medium, information is usually recorded in a small area in the form of a Fourier conversion hologram and multiple holograms with small areas are arranged in a circle or concentrically on the recording medium.

Referring to FIG. 15, there is shown an example of an arrangement of holograms to be recorded. In the figure, a photosensitive plate 201 comprises a photosensitive layer formed on a transparent base plate which is circular and thin, such as a plastic material or glass. The central portion of the photosensitive plate 201 is fixed to a shaft of a motor 202 and is rotatable about an axis which passes the center of the photosensitive plate 201 and is perpendicular to the surface of the photosensitive plate 201.

A focussing lens 203 is placed on the front side of the photosensitive plate 201 and disposed so that the focal plane thereof coincides with the surface of the photosensitive plate 201 or is in close proximity to the surface of the photosensitive plate.

An original 204 of a transparent type carrier information. The character information comprises a single character or a group of characters or letters arranged in matrix form.

Hologram recording of character information is conducted as follows: With the photosensitive plate 201 stopped, the original 204 is placed between the photosensitive plate 201 and the focussing lens 203 and is disposed in close proximity to the focussing lens 203.

Under this condition, the original 204 is illuminated by coherent light 205 through the converging lens 203. The coherent light 205 is a parallel ray and when it passes through the focussing lens 203, it becomes a focussed ray by the focussing lens 203 and passes through the original 204 and is focussed on the peripheral portion of the photosensitive plate 201 in the form of a spot as an object light. At the same time, the spot-like focused portion is illuminated by a reference light 206 capable of interfering with the object light. The reference light 206 is a parallel ray whose spot diameter is adjusted to be almost the same as that of the spot-like focused portion. The reference light 206 is caused to enter the photosensitive plate 201 from the same side as that of the object light.

The object light and the reference light 206 interfere with each other and the formed interference fringes are recorded on the photosensitive plate 201.

When recording is completed, the illumination light 205 and the reference light 206 are turned off and the plate 201 is rotated by a predetermined small angle by the motor 202 and is then stopped. A stepping motor or a servo-motor is used as motor 202.

As the next step, the original 204 in FIG. 15 is replaced with an original having another character information and the above-mentioned recording process is repeated. By repetition of such recording process, holograms with small areas are recorded in a circle in the peripheral portion of the photosensitive plate 201.

By performing necessary treatments, such as development, fixing and bleaching, of the thus recorded photosensitive plate 201, a recording member 201A as shown in FIG. 16 can be obtained.

In each of the multiple small area holograms H-1, H-2, H-3, . . . H-i, particular character information is recorded and the holograms are arranged circlewise on the recording member 201A.

The holograms can be arranged as shown in FIG. 17, with the holograms $H_1$-1, $H_2$-1, $H_3$-1, $H_1$-2, . . . $H_3$-i arranged concentrically in a recording member 201B. A circular shape formed by holograms arranged circlewise or concentrically is called a hologram circle, and the axis which passes through the hologram circle and which is perpendicular to the surface of the recording member is called a central axis of the hologram circle.

Referring to FIG. 18, there is shown the operation of reproduction of the recorded character information.

A central portion of the recording member 201A is fixed to a drive shaft of a motor 207 and is rotatable about the central axis of the hologram circle by the drive of the motor 207.

A reproduction light 209 is a ray of coherent parallel light having almost the same beam sectional area as that of the area of the small area hologram and is projected from a predetermined direction. When the reproduction light 209 illuminates the hologram H-j, for example, an image 204I of the character information recorded in the hologram H-j is reproduced by the diffracted light produced by the hologram H-j.

An image sensor 208 is disposed with the reading surface thereof coinciding with the reproduction position of the image 4I.

In FIG. 18, the position which is occupied by the hologram H-j is called the reproduction position and can be determined solely in the space of the apparatus.

When reading one character of the character group recorded in the hologram H-k in the character producing apparatus is necessitated, the character to be read is detected and when it is found that the character is recorded in the hologram H-k, a signal is applied to the motor 207 (stepping motor or servo-motor), so that the motor 207 rotates the recording member 201A in accordance with the signal, bringing the hologram H-k to the reproduction position. When this condition is realized, the reproduction light 209 is projected and the character information recorded in the hologram H-k is reproduced on the reading plane of the image sensor 208. In the meantime, a signal for indicating the position of the character to be read out of the reproduced character group is applied to the image sensor 208 and in accordance with the signal, the image sensor 208 selectively scans the character to be read and such scanning is converted to a series of electric signals.

In the case where the recording member 201B in FIG. 17 is employed instead of the recording member 201A in the apparatus in FIG. 18, the following steps are taken: For instance, when reproduction of the character information recorded in the hologram $H_2$-1 is reproduced, the recording member 201B is rotated about the central axis of the hologram circle so that the holograms $H_1$-1, $H_2$-1, $H_3$-1, are brought into their reproduction area. The reproduction area here means an area where any one hologram of the above-mentioned three holograms can be selectively illuminated. The direction of the reproduction light may be the same with respect to any hologram circle or may be different with respect to each hologram circle. In any case, the position of the reproduced image is the same even when any hologram in the reproduction area is illuminated and the holograms are recorded so as to attain the above-mentioned requirement.

When the hologram $H_2$-1 on which the character information to be read is recorded is brought into the reproduction area, the hologram $H_2$-1 is selectively illuminated by the reproduction light and the character information is reproduced on the reading plane of the image sensor 208. After this, the characters to be read are converted to electric signals in the above-mentioned manner.

Conventionally, the holograms brought to the reproduction position or into the reproduction area are illuminated by the reproduction light in the manner as shown in FIG. 19.

The projecting direction of the reproduction light 209 is determined by adjusting the configuration of a reproduction light source 210 for projecting the reproduction light 209, and of a reflector 211. From the reproduction light source 210, a parallel laser beam with a predetermined beam diameter is projected as the reproduction light 209.

Spacing between the holograms arranged in the recording member for practical use is very small.

Therefore, when the incident position of the reproduction light is deviated from the reproduction position, the reproduction light may illuminate the adjacent two holograms at the same time. In this case, independent character informations are overlapped and the overlapped information is reproduced on the reading plane of the image sensor 208, so that the reading of a desired character cannot be performed.

Furthermore, when the incident angle of the reproduction light is deviated from a predetermined angle, the position of a reproduced image is also deviated from the reading plane. Therefore, the reading becomes impossible in this case. When the direction of the reproduction light projected from the reproduction light source 10 is deviated slightly from a predetermined direction, or the reflection angle of the reflector 211 is slightly deviated from a predetermined angle, the change of the incident position and incident angle of the reproduction light is amplified. Therefore, conventionally, an extremely high accuracy is required for the setting of the disposing position of the reproduction light source 210 and the reflector 211. Such an incovenience can be reduced to some extent by disposing the reproduction light source 210 in proximity to the recording member. However, there is some limit in designing the apparatus.

SUMMARY OF THE INVENTION

It is therefore an object of the present invention is to provide an information recording method capable of reducing access time of a recording medium disc.

According to the information recording method of the present invention, a series of information is recorded in each of a plurality of tracks formed on the recording medium disc with a predetermined shifted recording, so that the access rotation angle is reduced, whereby the reading speed at the time of reproduction can be increased as desired and accordingly the performance of the recording method can be improved significantly.

Another object of the present invention is to provide a photoelectric conversion method for information patterns for use in information recording, by causing a scanning coordinate of a photoelectric conversion tube to coincide with the direction of a prescribed coordinate of a received light pattern, which does not necessitate high accuracy of the access drive of the recording medium.

According to the photoelectric conversion method for information pattern, marks of the inscripted coordinate attached to an information pattern are detected at a light receiving surface of the photoelectric conversion tube, and based on the detected value, the direction of the scanning coordinate is caused to coincide with the coordinate of the inscripted coordinate of the received light pattern. Thus, the output signals of the photoelectric tube correspond accurately to the received light pattern, whereby the quality of a printed character shape is prevented from deteriorating.

A further object of the present invention is to provide a hologram information reproducing apparatus for use in a character producing apparatus that can be employed in the information method according to the present invention.

According to an embodiment of a hologram information reproducing apparatus, a light condensing photo-transmittter is flexible and has a shape which is determined by a reproduction light. The reproduction light is transmitted from one end to the other end of the light condensing photo-transmitter and the diameter of the light condensing photo-transmitter is about the same as the beam diameter of the reproduction light or greater than the beam diameter. Since the light condensing photo-transmitter is flexible, the incident position of the reproduction light and the incident angle of the reproduction light at a reproduction position can be easily adjusted.

BRIEF DESCRIPTION OF THE DRAWINGS

For a better understanding of the invention as well as other objects and features thereof, reference is had to the following detailed description of the invention to be read in connection with the accompanying drawings, wherein:

FIG. 19 is a schematic perspective view of a conventional hologram information reproduction apparatus;

FIG. 20 is a schematic side view of an embodiment of a hologram information reproduction apparatus of the present invention;

FIG. 21 is a schematic side view of another hologram information reproduction apparatus of the present invention;

FIG. 24 is a schematic plan view of a main portion of a further embodiment of a hologram information reproduction apparatus of the present invention.

DETAILED DESCRIPTION OF THE PREFERRED EMBODIMENTS

Figure 1:
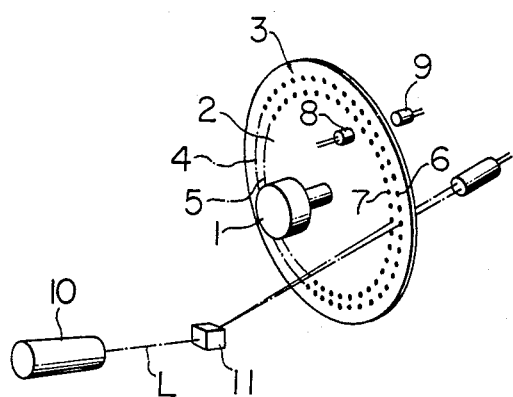
FIG. 1 is a schematic perspective view of a reproduction mechanism for general use in an information recording method.
Figure 2:
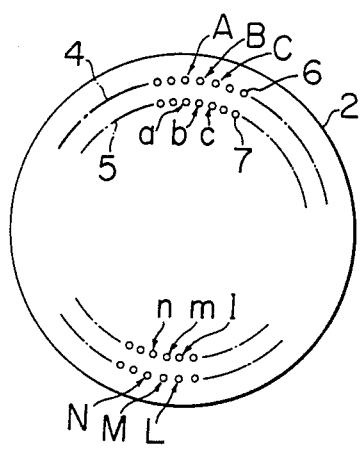
FIG. 2 is a plan view of a recording medium disc of FIG. 1.
Figure 3:
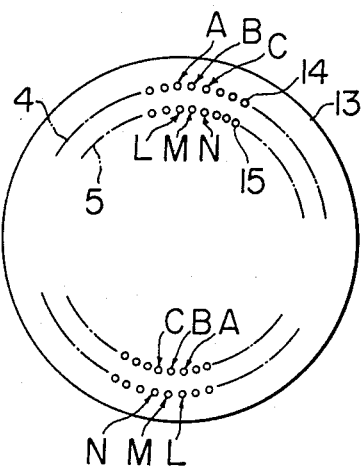
FIG. 3 is a plan view of a recording medium disc for use in the present invention.
Figure 4:
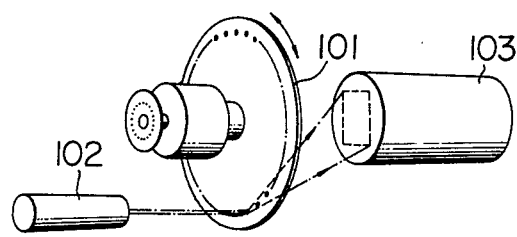
FIG. 4 is a schematic perspective view of a character producing apparatus of a hologram disc rotation type.
Figure 5:
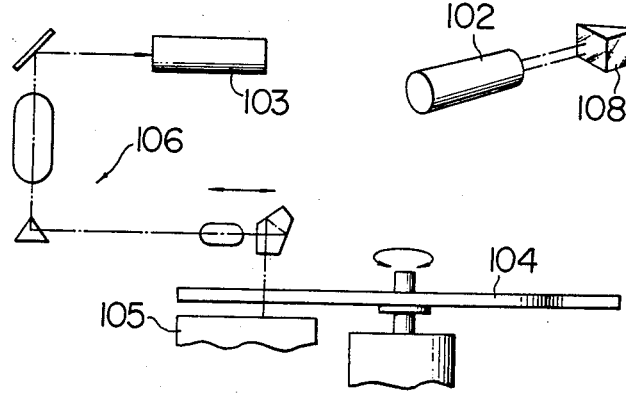
FIG. 5 is an outline of a character producing apparatus of a microfilm disc.
Figure 6:
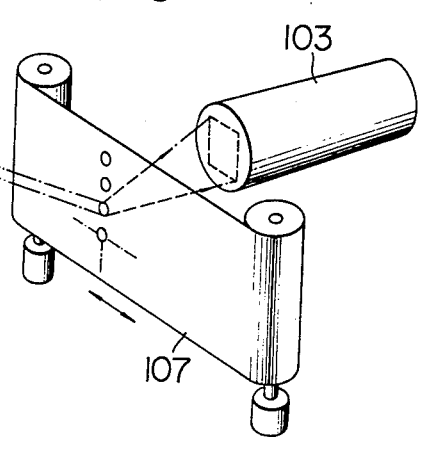
FIG. 6 is a schematic perspective view of a character producing apparatus of a hologram film running type.
Figure 7:
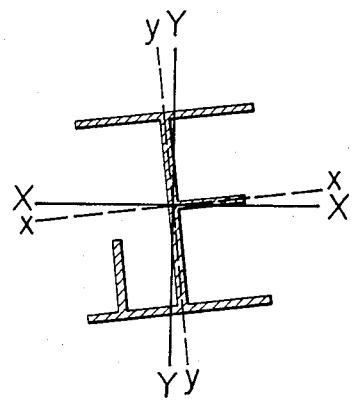
FIG. 7 shows a received light pattern of a kanji.
Figure 8:
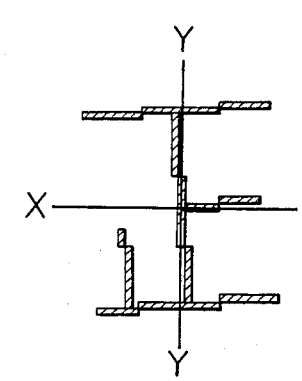
FIG. 8 shows a conversion pattern corresponding to the kanji in FIG. 7.

Referring to FIG. 3, there is shown a first embodiment of an information recording method according to the present invention. In FIG. 3, in each image information locations 14 and 15 arranged on two rows of the tracks 4 and 5 on a recording medium disc 13, a series of identical information ABC . . . LMN are recorded. The recording position of the information in each of the tracks 4 and 5 is shifted by $\pi$rad.

Therefore, on the surface of the recording medium, each piece of information is recorded at two places. A control servo-system is set so as to select the nearest image information of an image information 14 and an image information 15 when the address mark 3 is detected, so that the maximum rotation angle at the time of access operation is $\pi/2$Rad and the minimum rotation angle at the time of access operation is zero.

By increasing the number of the rows of tracks, the access rotation angle can be reduced as desired. For example, n rows of tracks (where n is an integer more than one) can be formed on the surface of a recording medium disc concentrically, with a series of identical information recorded in each row. In this case, by shifting the recording position in each row by $2\pi/n$ Rad, the maximum access rotation angle can be reduced to $\pi/n$ Rad.

Thus, in this embodiment, the access time can be significantly reduced by reducing the rotation angle of the disc at the time of the access operation, so that the reading speed at the time of reproduction can be increased.

In this embodiment, the reading speed can be increased, but the capacity of the recording medium disc for storing the information is decreased. More specifically, in one hologram with a 1-mm diameter, 60 to 100 characters can be recorded with the quality of character of 64×64 dots. Therefore, approximately 8,000 characters (kanji, kang, Roman letters, numerals, symbols, etc.) can be recorded in a single track with a 50-mm diameter of holograms with a 1.3-mm pitch. Except for a special case where a large quantity of information is required, the present embodiment is sufficient in capacity for general use with the above-mentioned advantages of the present embodiment retained.

Figure 9:
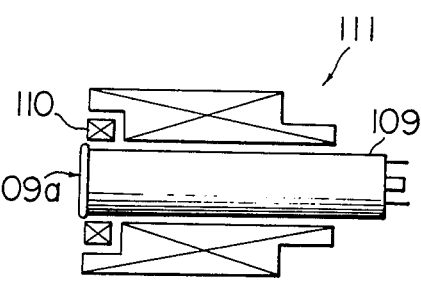
FIG. 9 is a schematic sectional view of a photoelectric conversion tube for use in the present invention.

Referring to FIG. 9, a rotation coil 110 is provided on the side of a light receiving surface 109a of a light tube 9, and a photoelectric conversion tube 111 is employed, whose coordinate direction of the beam scanning can be adjusted by controlling the voltage to be applied to the coil 110.

Figure 10:
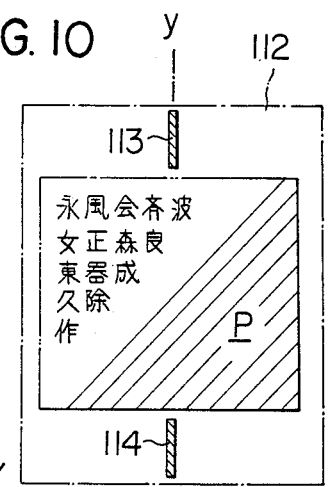
FIG. 10 shows the inscripted surface of the pattern.

Referring to FIG. 10, information pattern P comprising characters is recorded on the writing surface 112 of the recording medium and also marks 113 and 114 are placed above and below the pattern P along a vertical center line y-y.

Figure 11:
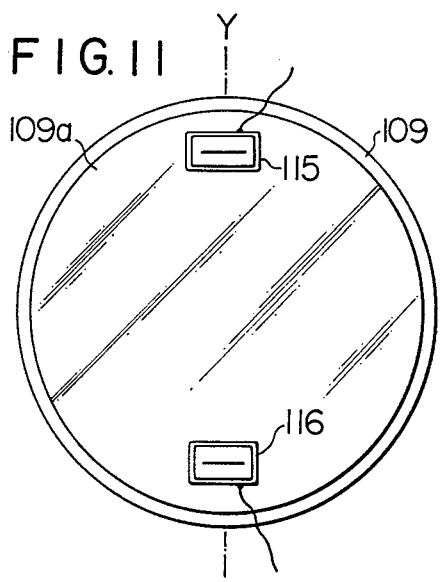
FIG. 11 shows the light receiving surface of the tube in FIG. 9.
Figure 12:
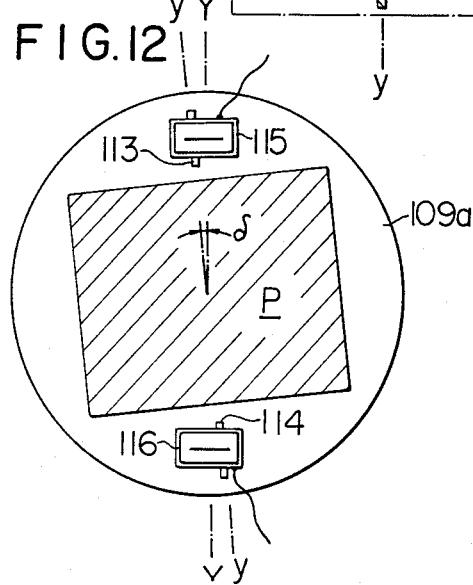
FIG. 12 shows the pattern on the light receiving surface.

Corresponding to the positions of the marks 113 and 114, on the light receiving surface 109a of the light receiving tube 109 of FIG. 9 has photoelectric conversion elements 115 and 116 for detection disposed thereon, for detection, above and below one scanning coordinate Y-Y, as shown in FIG. 11. When a ray of pattern light is projected on the light receiving surface 109a, the marks 113 and 114 are projected so as to intercept the light receiving surfaces of the photoelectric conversion elements 115 and 116, respectively.

Thus, a compensating voltage is applied to the rotation coil 110 in FIG. 9 corresponding in magnitude to the angle $\delta$ between the coordinates Y-Y and y-y detected from the difference of the light receiving bits of the photoelectric conversion elements 115 and 116, whereby the direction Y-Y of the scanning coordinate of the photoelectric conversion tube 111 is set so as to coincide with the inscription coordinate y-y of the pattern, namely in the direction parallel to the coordinate y-y.

Therefore, the beam scanning is performed correctly in the vertical and horizontal directions of the light receiving pattern at the time conversion operation of the photoelectric conversion tube 111, so that the electric signals produced by the conversion tube 111 accurately correspond to the light receiving pattern, without any deformation thereof.

Figure 13:
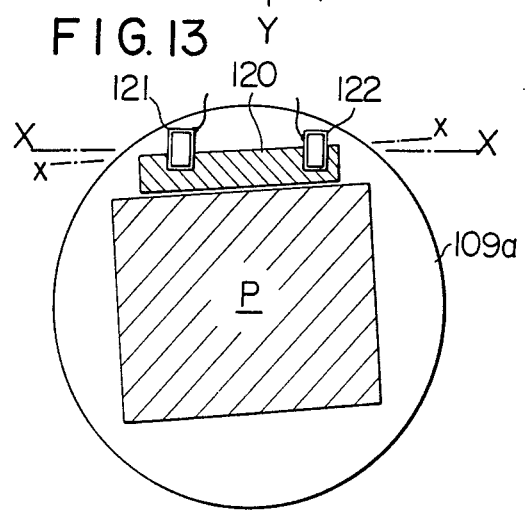
FIG. 13 shows a pattern on a light receiving surface in another embodiment according to the present invention.

In the above-mentioned mark detecting means, the detection is performed by the digital signal processing of the photoelectric conversion elements 115 and 16. Instead of this, the rotation coil 110 can be likewise controlled by the analog signal processing by use of a photodiode in the photoelectric conversion elements. For example, as shown in FIG. 13, a band-shaped mark 120 is placed in an upper edge portion of the information pattern P and at the same time, corresponding to the mark 120, diodes 121 and 122, which serve as the photoelectric conversion elements, are disposed on opposite sides of an upper portion of the light receiving surface 109a, so that the rotation coil 110 is controlled by the difference between the detected quantity of light of the diode 121 and that of the diode 122.

Figure 14:
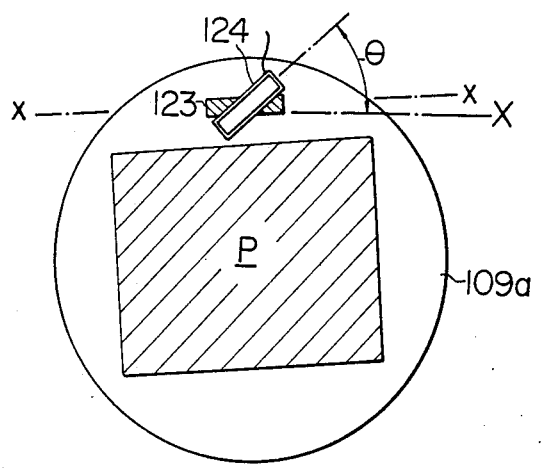
FIG. 14 shows a pattern in a further embodiment according to the present invention.
Figure 15:
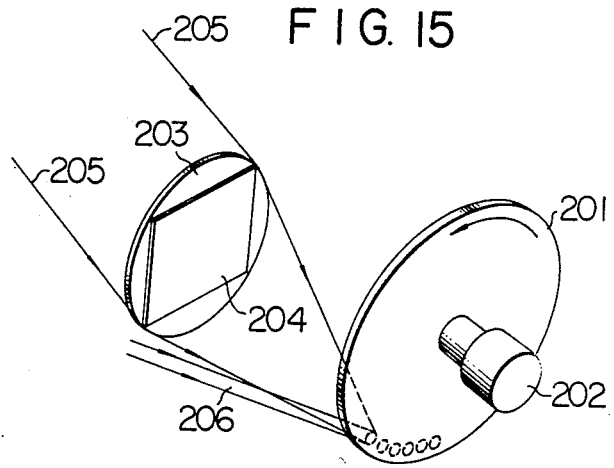
FIG. 15 is a simplified perspective view of a hologram recording apparatus.
Figure 16:
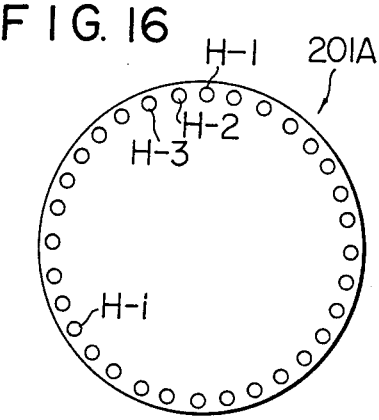
FIG. 16 is a schematic plan view of a recording member on which character information is recorded.
Figure 17:
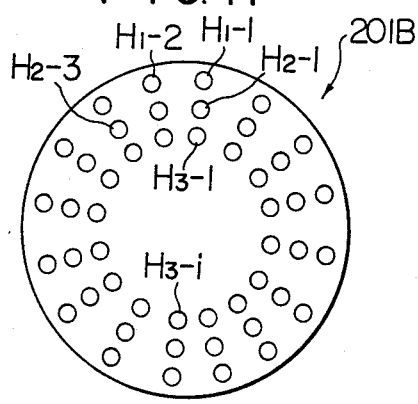
FIG. 17 is a schematic plan view of another recording member on which character information is recorded.
Figure 18:
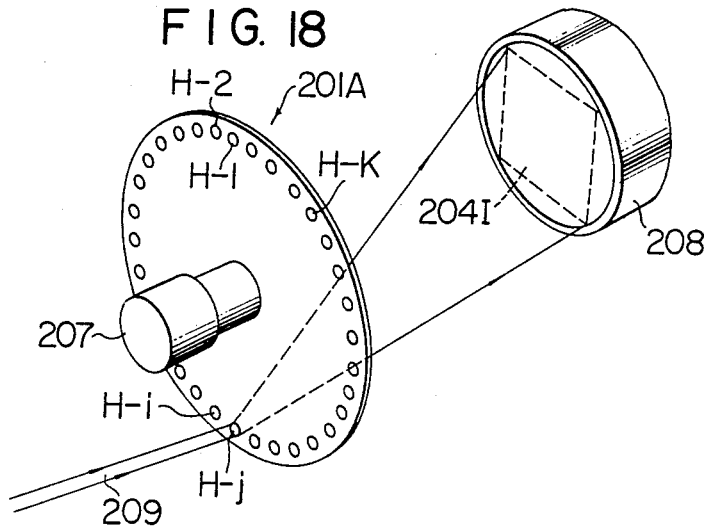
FIG. 18 is a simplified perspective view of apparatus used in reproduction of a character information.

Referring to FIG. 14, there is shown a further method of photoelectric conversion of information pattern. In FIG. 14, a band-shaped mark 123 is placed in the horizontal direction x-x in an upper portion of the information pattern P and corresponding to the mark 123, a photodiode 124 is disposed slantingly with an angle θ in an upper portion of the light receiving surface 109a. The detected received light quantity of the diode 124 is compared with a reference received light quantity in the condition where the scanning coordinate X-X coincides with the inscription coordinate x-x and the rotation coil 110 is controlled by the difference between the two.

Thus, the directions of both coordinates can be caused to coincide with each other as mentioned above.

In the method employing the marks 113 and 114, and that employing the mark 120, in addition to the angle of the two coordinates, the shift of the light receiving pattern P can be detected at the same time, since the sum of the bit numbers or the sum of the received light quantity indicates the shift of the pattern P. The present invention also includes a light condensing photo-transmitter, which is flexible and whose shape is determined in accordance with the reproduction light.

The light condensing photo-transmitter is generally known as SELFOC (trade name), which is a thin cylindrical photo-transmitter and is characterized in that the refractive index thereof changes according to a quadratic curve in the radius direction of the cross sectional surface, with the axis in the photo-transmitting direction being a symmetric axis. The quandratic-curve-like change of the refractive index is characterized by a constant called the refractive index distribution coefficient, which generally depends upon the wavelength of the transmitting light.

Here, the refractive index distribution coefficient is represented by $[g(\lambda_o)]^2$, where the wavelength of the reproduction light is $\lambda_o$.

Due to the optical characteristic that the refractive index changes according to a quadratic curve as mentioned above, a ray of light transmitted through the light condensing photo-transmitter travels along a sine curve. The wavelength of the sine curve is represented by $2\pi/g(\lambda_o)$.

When the light condensing photo-transmitter is cut to a length represented by $$(2n + 1)\frac{2\pi}{g(\lambda_o)},$$

where n is zero or a positive integer, the thus cut light condensing photo-transmitter has the following property: When a ray of parallel light with the wavelength $\lambda_o$ is caused to enter one of the thus cut light condensing photo-transmitter, a ray of parallel light comes out of the other end of the light condensing photo-transmitter.

In the case of the ordinary photo-transmitter, for example, the so-called optical fiber, even when a ray of parallel light is caused to enter one end thereof, a ray of scattering light comes out of the other end of the photo-transmitter.

Due to the optical characteristic of the light condensing photo-transmitter, the above-mentioned cut light condensing photo-transmitter can constitute part of the light path of the reproduction light. In other words, it is required that the reproduction light be a ray of parallel light and this requirement can be met when the light condensing photo-transmitter is used as part of the light path since parallelism of the transmitted light can be retained.

Referring to FIG. 20, there is shown a further embodiment according to the present invention, in which a light condensing photo-transmitting element 220 having a comparatively great flexibility is employed, and referring to FIG. 21, there is shown a further embodiment according to the present invention, in which a light condensing phototransmitting element 221 having a comparatively small flexibility is employed.

The end surface from which the reproduction light 209 comes is disposed in proximity to the reproduction position, whereby easy and accurate adjustment of the configuration of the reproduction light and the reproduction position can be attained.

Furthermore, the reproduction light 209 is caused to enter the light condensing photo-transmitter in the direction normal to the end surface of the light condensing photo-transmitter, with the light axis of the reproduction light 209 coinciding with the central axis of the light condensing photo-transmitter.

Figure 22:
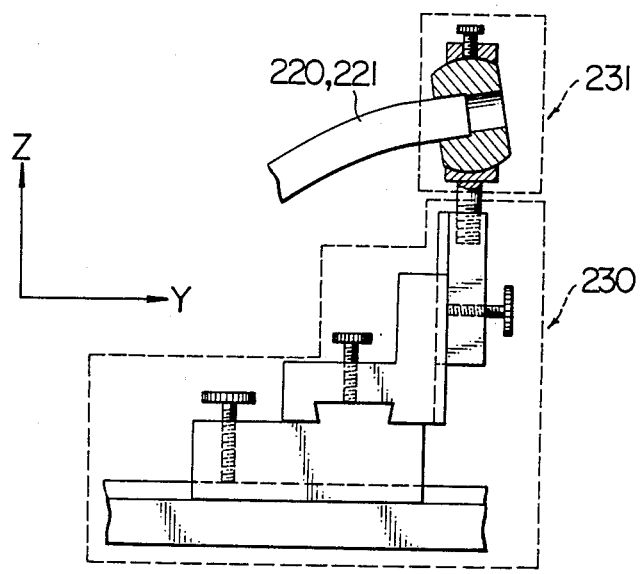
FIG. 22 is a schematic side view of one example of a method for supporting an end portion of a light condensing photo-transmitter.

Referring to FIG. 22, there is shown an example of a holding mechanism for the light condensing phototransmitters 220 and 221 for use in the abovementioned two embodiments.

In FIG. 22, reference numeral 230 represents a known XYZ stage and reference numeral 231 represents a holding member employing a knuckle joint. The holding member 231 is fixed to a top portion of the XYZ stage 230 and serves to fixedly hold the end portions of the light condensing photo-transmitter. The position of the holding member 231 and accordingly the positions of the end portions of the light condensing photo-transmitters 220 and 221 can be adjusted in the direction of X by the stage 230, which is normal to the figure, and also in the directions of Y and Z. The direction of the end surfaces of the light condensing phototransmitters can be adjusted as desired.

Figure 23:
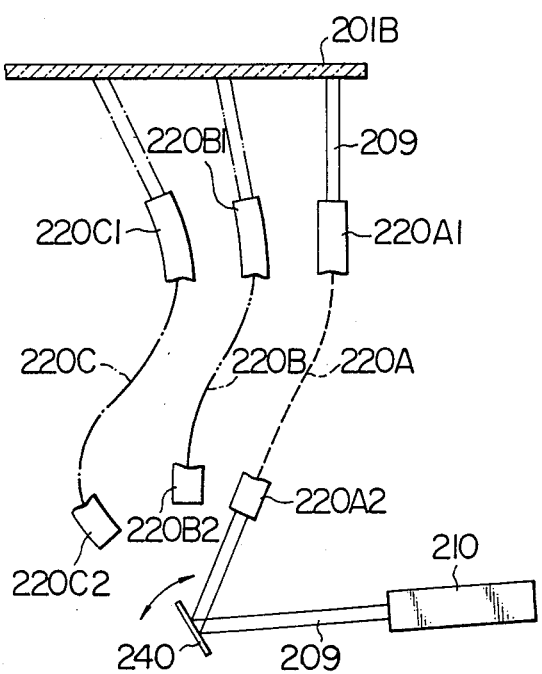
FIG. 23 is a schematic plan view of a main portion of another embodiment of a hologram information reproduction apparatus for use in the present invention.

Referring to FIG. 23, there is shown a further embodiment of the present invention, which is applied to a character producing apparatus employing the recording member 201B.

End portions 220A1, 220B1 and 220C1 of the light condensing photo-transmitters 220A, 220B and 220C are fixed with the respective predetermined postures in proximity to the reproduction area corresponding to their respective hologram circles. The predetermined postures here mean the positions which permit the reproduction light 209 to illuminate the holograms from the appropriate direction. The adjustment of such postures can be performed, for example, as shown in FIG. 22.

The other end portions 220A2, 220B2 and 220C2 of the light condensing photo-transmitter 220A, 220B and 220C are arranged in the circumference of a circle. This arrangement can be made by use of the position adjustment apparatus as shown in FIG. 22. A galvanomirror 240 is disposed so that the central axis of the above-mentioned circumference coincides with the axis about which the galvanomirror 240 pivots. A ray of parallel light from the reproduction light source 210 is caused to enter the galvanomirror 240 and with the pivot angle of the galvanomirror 240 changed, the above-mentioned ray of parallel light is caused to enter selectively, any of the light condensing photo-transmitters 220A, 220B and 220C, whereby a desired hologram in the reproduction area can be illuminated selectively by the reproduction light.

In the case where the recording member 201B1 in which the holograms are arranged concentrically is employed, as shown in FIG. 24, the light condensing photo-transmitter 220 is held so that the light projecting end side thereof is swingable about point P, for example, by a servomotor, whereby a desired hologram in the reproduction area can be selectively illuminated by the reproduction light 209. In this case, the flexibility of the light condensing photo-transmitter 220 can be utilized in the adjustment of the posture of the light condensing photo-transmitter and also in changing the direction of the reproduction light.

What is claimed is:

1. In an information recording method capable of recording multiple pieces of hologram information in areas disposed along concentric tracks arranged on the surface of a hologram recording medium disc, and of reading and reproducing the recorded hologram information, the improvement comprising the steps of:

setting a plurality of n different diameter concentric tracks on the surface of said recording medium disc;

recording an identical series of hologram patterns of information around substantially the entire circumference of each of said tracks, with the recording position of said patterns of information in each track shifted by $2\pi/n$ rad with respect to like patterns in the other tracks;

illuminating the medium disc at a circumferential location thereof with an illuminating light to reproduce hologram information at that circumferential location;

rotating the medium disc in one of the clockwise and counterclockwise directions no more than $\pi/n$ rad, to bring any selected one of the series of information to the fixed circumferential location;

holding the disc stationary while illuminating the disc; and deflecting the illuminating light radially of the disc to illuminate the selected information in its respective track.

* * * * *